United States Patent [19]
Webb et al.

[11] 3,786,503
[45] Jan. 15, 1974

[54] EARTH MOVEMENT INDICATOR

[76] Inventors: Eugene E. Webb; Leo G. Kopelman, both of East Bank, W. Va. 25067

[22] Filed: Nov. 17, 1972

[21] Appl. No.: 307,221

[52] U.S. Cl.................... 340/421, 340/282, 200/56, 61/35, 33/1 H
[51] Int. Cl. ........................ E21d 21/02, G08b 21/00
[58] Field of Search.................... 340/421, 282, 213; 85/62; 200/52, 56; 61/35; 33/1 H

[56] References Cited
UNITED STATES PATENTS

| | | |
|---|---|---|
| 3,594,773 | 7/1971 | Conkle.............................. 340/282 |
| 3,341,843 | 9/1967 | Walsh................................ 340/421 |
| 3,646,553 | 2/1972 | Conkle............................... 340/421 |
| 3,111,655 | 11/1963 | Kotarsky et al..................... 340/213 |
| 2,692,924 | 10/1954 | Williams et al. ..................... 200/85 |

Primary Examiner—John W. Caldwell
Assistant Examiner—William M. Wannisky
Attorney—Frederic C. Dreyer

[57] ABSTRACT

An explosion-proof subsidence-indicator for mines, tunnels and earthworks including a non-conductive body including a battery-actuated warning-light encased in a sealed chamber, and a spring-loaded probe extending outward from the chamber to engage the mine roof.

10 Claims, 3 Drawing Figures

PATENTED JAN 15 1974 3,786,503

EARTH MOVEMENT INDICATOR

BACKGROUND OF THE INVENTION

The present invention relates to warning indicators for dangerous earth-movements and is concerned, more particularly, with indicators for signalling initial stages of subsidence in mines to provide early warning of - and escape from - impending disasters.

BRIEF DESCRIPTION OF THE PRIOR ART

Several attempts have been made in the hope of providing early warnings of mine cave-ins.

In the earliest days, a walk-through by a thoroughly experienced miner, visually inspecting the mine and thumping timber-uprights to test changes in their resonance under load, was the best hope in preventing disaster. This provided a degree of safety where the man walking through and "sounding" was intimately familiar with his section, but was subject to even slight human errors in sight, hearing and memory.

More recent attempts have included posts with displaceable members to indicate dimensional changes between the mine roof and the floor or the structure on which the post is set. These have proved to be operable for their intended purpose of indicating subsidence in the mine, but have fallen short in terms of complexity and cost and, in particular, in terms of safety and in their convenience-of-use and acceptance by the miners.

Where light signals are used, arcing switches create, of course, an explosion hazard of a probability far greater than the probability of a case-in.

Where light signal switches are enclosed, they have been associated with posts and arrangements of such complexity as to prevent quick testing of the alarm to ensure that the unit is functioning properly.

Metal indicator-posts have been found to be dangerous to handle in modern highly electrified mines.

None of the prior units have been found to be entirely satisfactory.

SUMMARY OF THE INVENTION

The present invention provides an extremely simple alarm which is not only most convenience in installation and completely safe in handling, but also makes possible a return to quick . . . but reliable . . . walk-through testing of the alarms in the section to be worked. Also, where danger is found to be probable, the alarms enroute can be quickly reset, without tools, to warn others in approach to the danger zone.

In general, the preferred form of the present invention comprises a telescoping post of non-conducting material, such as resin-bound glass fibers or any of the "plastics" suitable for making tubular structures.

A first section of the post includes a hollow transparent-wall section having closing caps at each end. One of the closing caps is provided with an axial bore which receives and seals against a probe arm extended axially therethrough to the exterior of the first section. The probe arm is biased outwardly by a spring.

The interior of the first section includes a light bulb positioned opposite the transparent wall activated by a battery means via a switch positioned to be engaged by the probe arm in a retracted position.

The second section of the post is adapted to telescope with respect to the first section and means are provided for locking the first and second sections in selected telescoping positions.

BRIEF DESCRIPTION OF THE DRAWINGS

A better understanding of the invention may be derived from the following description and from the accompanying drawings in which.

DESCRIPTION OF THE PREFERRED EMBODIMENT

Figure 1:
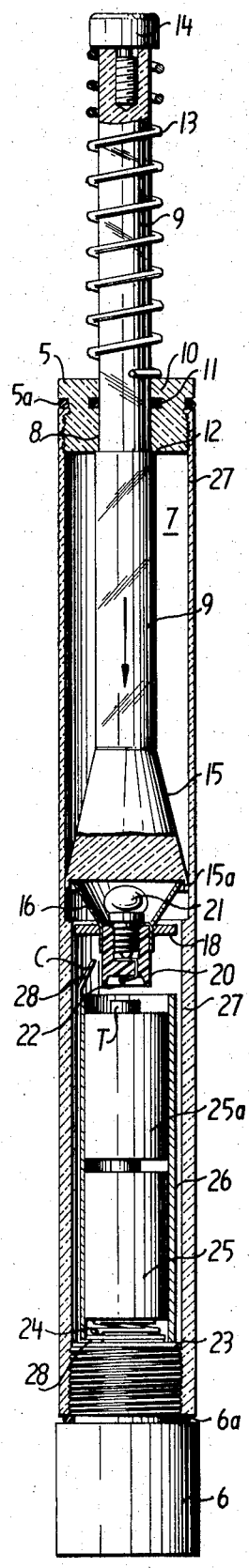
FIG. 1 is a perspective, sectional view of the preferred form of the probe section of the present invention.
Figure 2:
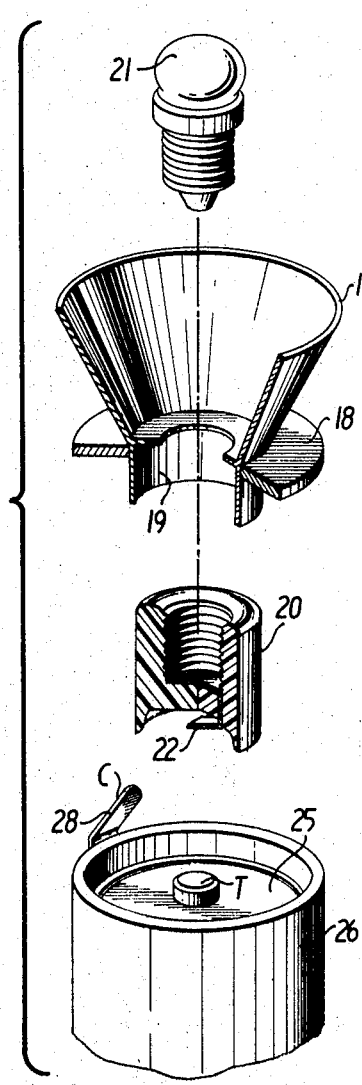
FIG. 2 is a transverse, sectional view taken along lines 2—2 of FIG. 1.

As shown in the drawings, the preferred form of the present invention comprises an alarm post 1 including a first probe section 2 and a second, mount section 3. The sections preferably are both hollow and cylindrical, while the probe section 2 is received telescopically in the mount section 3 which carries any suitable position lock such as the wingscrew 4.

The probe section 2 is transparent or translucent and is closed at its ends by threaded caps 5 and 6 with gaskets 5' and 6' respectively to form a sealed chamber 7 therein. The cap 5 has an axial bore 8 receiving a probe arm or rod 9 therethrough. The bore 8 includes an annular recess 10 which carries a seal such as an O-ring 11 sealing between the cap 5 and the rod 9.

Externally of the sealed chamber 7, the probe rod 9 carries a surrounding coil spring 13 which is compressed between the cap 5 and an end fitting 14 threaded at the terminal end of the rod 9. The fitting 14 may have any other suitable engagement on the rod 9.

Interiorly of the sealed chamber 7, the probe rod 9 has a shoulder 12 limiting outward travel thereof and a conically-enlarged portion 15 which is secured against a flashlight-type reflector 16 such as by a snap-lip 15a.

The reflector 16 may be formed of any suitable material, but includes a metallic bulb socket 17 with an annular, metallic flange 18. The bulb socket 17 includes a recess 19 for receiving an internally threaded plastic holder 20 which receives a threaded bulb 21 to lock the assembly. The holder 20 has a contact strip 22 extending therethrough from the base of its threads to the lowest portion of the holder.

The probe rod 9 preferably is formed of a clear plastic to allow light from the bulb 21 to pass from the reflector 16 to the upper part of the sealed chamber 7. If the rod 9 is to be formed of an opaque material, a skeletal or otherwise open enlargement will necessarily be substituted for the transparent cone section 15.

Similarly, it is imperative that the probe section 2 be formed of a transparent material, at least in the zone adjacent the bulb and reflector. It is convenient to from the section 2 of a single tube of clear plastic. I prefer to use the "Plexiglass" brand of clear plastic throughout.

At the end of the probe section 2 opposite the probe rod 9, the cap 6 has a surface 30 supporting a battery assembly including a mettallic disc, 23 a coil spring 24 engaging flashlight batteries 25, 25a within a thin plastic sleeve 26 which bears snugly, but slideably, against the inner wall 27 of the probe section. A contact bar 28 engages the spring 24 and is extended along the assembly between the inner wall 27 and the sleeve 26. At its end remote from the coil spring 24, the contact bar is bent inwardly toward the center of the sealed chamber to a position adjacent but spaced from the battery's terminal T. The precise position of the contact end C of the bar 28 is adjusted to engage the annular flange 18 at or before the longitudinal-travel point at which the contact strip 22 engages the battery terminal T. Preferably, both the contact strip 22 and contact end C of the bar 28 are moderately flexible to provide a non-critical switch mechanism for activating the bulb.

OPERATION OF THE PREFERRED EMBODIMENT

Figure 3:
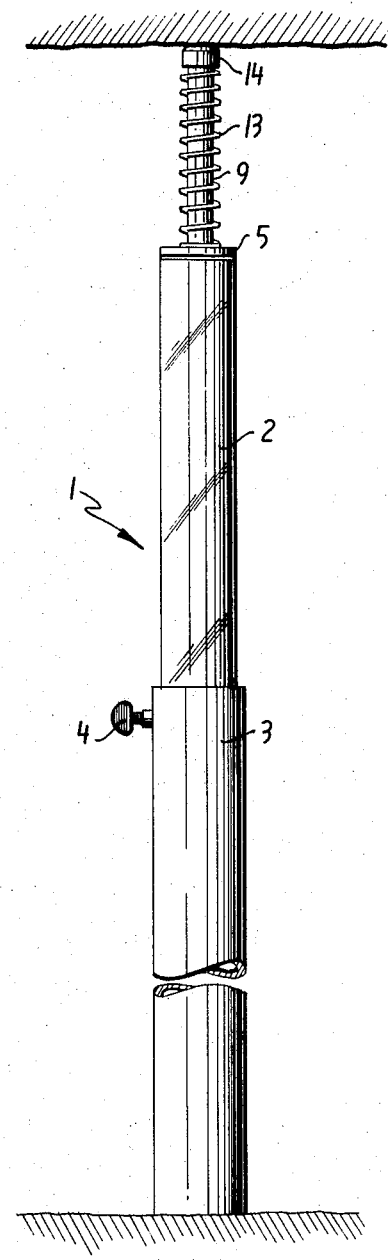
FIG. 3 is a view, on a reduced scale, showing an installation of the preferred form of post.

In operation, as best shown in FIG. 3, the post 1 is installed in a generally upright position between the roof R and the floor F of a mine.

The thumbscrew 4 is loosened to permit free motion of the probe section 2 and the mount section 3. With the mount section 3 placed in the desired location, the probe section 2 is extended to press the probe rod 9 against the mine roof R. The probe section 2 is then raised to the point at which the bulb and reflector meet the contacts T and C, respectively, to light the bulb 21. The probe section is then lowered a predetermined distance — for example, one-sixteenth or one-eighth inch - so that the "switch" contact TC is broken and the thumb-screw is then tightened securely.

Thereafter, the bulb 21 remains unlighted until such time as the original dimension between the mine roof and floor is shortened by the predetermined distance. For example, if the roof beings to sag, it will force the probe rod 9 downward against the coil spring 13 and thus force the reflector assembly and bulb 21 downward into switching contact with the terminal T and contact C, lighting the bulb and giving a visual warning to anyone in the area.

Of unique advantage in the alarm of my invention is the ease with which it can be tested. Batteries, of course, deplete themselves over periods of time, even if current is not drained from them, and dead batteries in an alarm of this type could prove fatal to miners.

However, the alarm post of my invention permits a return to the quick, walk-through inspection, not only to seek tripped alarms, but also to make a momentary check of each alarm post. This is effected by simply grasping an alarm post (about 4 lbs. weight) in one hand and lifting it against the coil spring 13. If the bulb lights and is sufficiently bright, the alarm post is obviously reliable. If it does not light, the need for replacement is readily apparent.

This is accomplished without wrenches or other tools, and without the need for recalibration or change in the post setting. Also, battery and bulb replacement is a simple matter of unscrewing the end caps to reach the sub-assemblies.

If a sagging roof trips an alarm in a section, the fire boss or anyone can very quickbly reset our alarms - without special tools - as he leaves the section to warn others approaching against entering the sagging section.

It is also of particular importance in my invention that I provide a sealed, vapor-proof, alarm-emitting chamber 7 which easily meets the volumetric limitation of 30 cubic inches which was recently established for mine lighting units.

It is to be understood that the alarm post of my invention may be installed in any position, including both horizontally and upside-down from the position shown in FIG. 3. In trenches, for example, the axis of danger lies generally in the horizontal plane between the side walls, and the post should be installed on that axis.

Various changes may be made in the details of the invention as disclosed without sacrificing any of the advantages thereof or departing from the scope of the appended claims.

We claim:

1. An earth-movement indicator comprising an
   a. elongated post having
   b. a probe section and
   c. a mount section, one of said probe section and said mount section being telescopically received within the other section,
   d. means for locking said probe section and said mount section in selected telescopic positions, said probe section including
   e. a wall section adopted to transmit light therethrough and
   f. an end wall, said end wall having
   g. an aperture therein,
   h. a source of light enclosed in said probe section adjacent said light-transmitting wall section, said light source including
   i. switch means,
   j. a probe arm associated with said switch means, said probe arm being extended through said aperture in the end wall,
   k. bias means for biasing said probe arm outwardly of said probe section, and
   l. sealing means for sealing between said probe arm and said endwall.

2. An indicator according to claim 1 in which said probe section and said mount section are formed of non-conducting material.

3. An indicator according to claim 2 in which said probe section is formed of transparent plastic.

4. An indicator according to claim 3 in which said enclosed light source includes a battery source and a light bulb, said light bulb being mounted in a reflector assembly, and said reflector assembly being mounted for reciprocation with said probe arm, whereby the reflector and bulb comprise a portion of said switch means.

5. An indicator according to claim 4 including guide means for guiding said probe arm within said probe section.

6. An indicator according to claim 5 in which said probe arm includes a shoulder positioned to engage said endwall.

7. An indicator according to claim 6 in which the probe section has a cylindrical inner wall, said reflector is conical, and said guide means includes a transparent conical section on said probe arm adjacent said reflector.

8. An indicator according to claim 7 in which said reflector is secured on said transparent conical section.

9. An indicator according to claim 8 in which said reflector is mounted within a lip on said transparent conical section.

10. An indicator according to claim 9 in which said probe section includes a removeable cap at its end remote from the probe arm, said removeable cap being adapted to support a battery assembly within said probe section, said battery assembly including a sleeve longitudinal contact means extended along said sleeve for providing contact between one end of said battery assembly and said reflector assembly.

* * * * *